May 28, 1968  R. C. HALL  3,385,575

GAS LIQUID CONTACTING APPARATUS

Filed July 29, 1964  2 Sheets-Sheet 1

INVENTOR.
RAYMOND C. HALL
BY Stowell & Stowell
ATTORNEYS

May 28, 1968  R. C. HALL  3,385,575
GAS LIQUID CONTACTING APPARATUS
Filed July 29, 1964  2 Sheets-Sheet 2
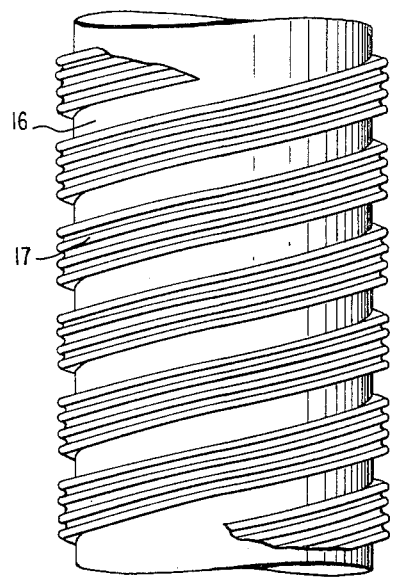
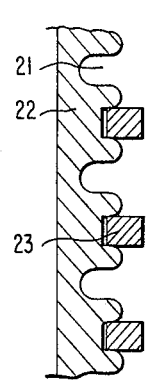
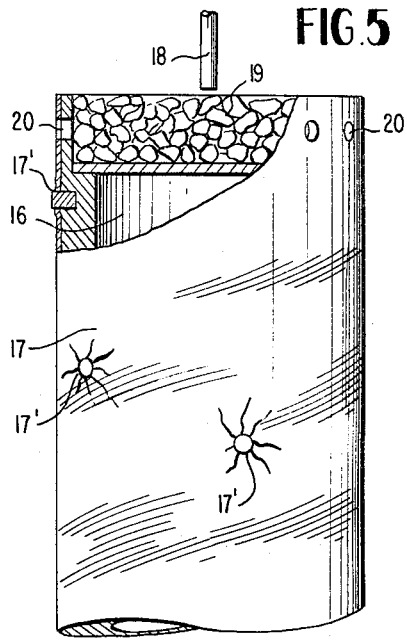
INVENTOR.
RAYMOND C. HALL
BY *Stowell & Stowell*
ATTORNEYS

United States Patent Office 3,385,575
Patented May 28, 1968

3,385,575
GAS LIQUID CONTACTING APPARATUS
Raymond C. Hall, 2121 Browning Ave.,
Manhattan, Kans. 66502
Filed July 29, 1964, Ser. No. 385,917
6 Claims. (Cl. 261—112)

This invention relates to an apparatus for efficiently carrying out mass transfer between fluids and, in particular, transforming a fluid component of a fluid-fluid contacting system from one phase to a second phase.

The invention will be described, for purposes of illustration, with references to a method and apparatus for extraction of water vapor from a water vapor containing gas and for extraction of fresh water from saline solutions.

The world's fresh water supply is gradually becoming inadequate to meet the ever-increasing needs of a more complicated society. Much research effort has been and is being expended in studying the recovery or separation of potable water from various saline waters. As is not so generally recognized, the air around us also contains a vast amount of water, the water being in the form of water vapor and free of dissolved salts. The present invention relates to a method and apparatus for the extraction of water from the atmosphere.

Deliquescent or hygroscopic substances such as the glycols and certain inorganic salts are known to absorb water from the air. It is also known to recover the water from these hydroscopic substances and, at the same time, regenerate them so that they can again absorb atmospheric moisture. As will be explained below, prior art methods for the absorption of water vapor from the air are relatively inefficient and/or require a relatively complicated or energy consuming apparatus.

It is, therefore, an object of the present invention to provide a more practical apparatus suitable for the recovery of water vapor from the air and fresh water from saline water.

Other objects and features of the present invention will be apparent from the following detailed description of my method and apparatus, and from consideration of the figures in the drawing.

I have been able to attain these desired objectives by providing an improved apparatus and method for contacting air with the hydroscopic liquid which will absorb water vapor from the air. This is accomplished by providing an improved distributor for the liquid which comprises a solid support for the liquid together with a material, which absorbs the liquid, in close proximity to the solid support. The support and the absorbent material, which must be used in conjunction with each other, are termed the back support member and the blanket member, respectively, and together they constitute the liquid distributor.

In its process aspect, my invention is a method for recovering a liquid from a gas containing the vapor phase of the liquid which includes the steps of passing a liquid absorbent to a liquid-distributor comprising a back support member extended in a plane at an angle to the horizontal and a blanket member in close proximity therewith, directing a gas containing the vapor phase of the liquid to be absorbed into contact with the liquid absorbent as it flows down said liquid-distributor whereby the liquid absorbent absorbs the vapor from the vapor containing gas, recovering the thus absorbed liquid from the liquid absorbent, and returning the thus regenerated liquid absorbent to the said liquid-distributor.

In its apparatus aspect, my invention is an apparatus for extracting a liquid from a gas containing the vapor phase of the liquid which comprises a back support member extended in a direction at an angle to the horizontal and a blanket member in close proximity therewith, said blanket member being provided with projecting ridges extending in a direction having a major horizontal component.

My invention will be further described and made clear by reference to the accompanying drawings:

FIGURE 1 of the drawings is a flow diagram illustrating a cyclic system having a unit for the absorption of moisture from the air and a solar distillation unit for the recovery of the absorbed moisture from the hydroscopic absorbent, the regenerated absorbent being returned to the absorption unit;

FIGURE 5 is a front view of a cylindrically shaped back support covered with a spirally wound ridged blanket member, the upper part of the figure being in section;

FIGURE 6 is a front view of a liquid-distributor wherein the back support member is only partially covered with a spirally wound ridged blanket member;

FIGURE 7 is a view in section of a grooved back support member only partially covered with a narrow blanket member; and FIGURE 8 is a flow diagram of a cyclic system for the recovery of fresh water from saline solutions.

Figure 1:
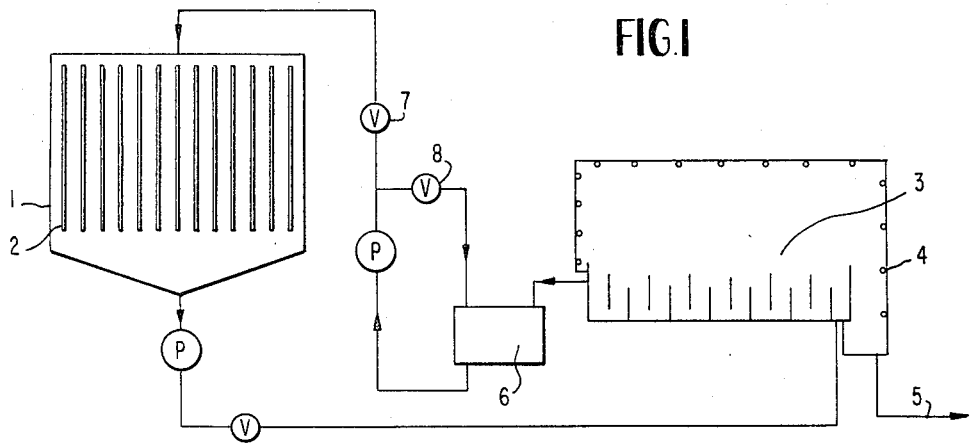

My invention is further illustrated by the following general discussion and description of the figures in the drawings:

It can be said that the primary object in gas-liquid contacting operations is to transfer a given component from one phase to a second phase. For example, when air is contacted with a hygroscopic liquid, water vapor is removed from the air and is transferred into the hygroscopic glycol solution. In a companion operation, the recovery of the water from the hygroscopic solution, water is removed from the liquid phase and is transferred into a gas phase. In the operation of such processes, the liquid is commonly handled so as to create a large area of contact between the gas phase and the surface of the liquid. Various packings and other physical devices are used to promote such contact.

In addition, the rate per unit area at which the transfer takes place is of major importance. It is well known that the rate per unit area of transfer will increase as the velocity of movement of one phase relative to the other is increased. It is also known that energy is required to create this movement and, in the usual case, only part of the energy required to maintain movement of gas is effective in increasing the rate of mass transfer. The greater part of the added energy is consumed mostly by impact against surfaces which are perpendicular to the direction of flow and by drag against surfaces which are substantially parallel to the direction of flow. In most transfer equipment, such as packed towers, baffle plate units, perforated plates, etc. an appreciable part of energy required to maintain movement is lost in the impact effect and this portion of the pressure drop energy is ineffective in increasing the mass transfer rate.

It is known that in order for a major part of the energy so required to maintain flow of the gas and the liquid phases past each other to be used to enhance the mass transfer coefficient, the liquid should be spread over surfaces which are at an angle and preferably substantially parallel to the direction of flow of the gas. The depth of the liquid layer should be maintained substantially constant with respect to time, at a given point over wide ranges of flow rates of the liquid. The depth of the liquid layer, however, may vary from point to point on the surface over which the liquid flows. This variation in depth, from point to point on the liquid distributor permits control of the time of contact, etc. per unit quantity of liquid, between the absorbing liquid and the vapor phase. Thus, it may be desirable to construct the liquid layer such that its thickness varies, in a controlled manner, through various regions of the gas to liquid absorbent contact areas. For example, it may be desirable to create a thin film thickness at the top of the contactor and to gradually increase the thickness of the film as the liquid flows down the contactor unit.

The duration of contact between the gas and the liquid phases is of particular importance where the resistance to movement of a highly soluble material through the liquid absorbing phase is high. Under such conditions it is desirable that time of contact between the two phases be extended. This may be accomplished, in effect, by creating cross flows of liquid within the liquid absorbent and by increasing the depth of liquid in a given region. Such cross flows should bring liquid absorbent having relatively low concentrations of the liquid phase to the regions of contact between the gas and the absorbing liquid.

It has been found that the absorption of water vapor from the air is enhanced by promoting the air-liquid contact using as a liquid distributor a back support member in conjunction with a hold-up blanket. The hold-up blanket serves at least three primary purposes. First, it tends to hold a uniform depth of liquid to the area of liquid created by the back support, the magnitude of this depth is established chiefly by the thickness of the blanket. Second, it tends to hold, on a microscopic scale, a uniformity of rate of volume-of-liquid flow over any given point. Third, it causes cross flows, as to be more fully described hereinafter, analogous to turbulence within the body of the flowing liquid layer.

When only the back support member without the blanket member was used, it was found that the absorbent liquid would wet all regions of an adequately and uniformly cleaned support. However, severe channeling occurred at any measurable liquid flow rate with the liquid tending to follow certain paths. The liquid would flow at relatively high velocities down these select paths while the rate of flow was negligible at other locations in the support surface. A similar type of inferior result was obtained when only the blanket member without the back support member was used. Severe channeling over some parts of the surface was observed and, in other regions, the flow was very small or even negligible. However, when the back support member was covered with the blanket member, the liquid distributed itself uniformly and uniformity of flow down the distributor was obtained. These beneficial results are attributed to the interaction between the back support member and the blanket member. The support member tends to force the liquid in the blanket member to spread out and the blanket member tends to inhibit channeling and other variations in flow rate and tends to maintain a uniformity of depth of the liquid layer.

There are a great many types of materials which may be used to make the supporting member and the blanket member. In order to be able to absorb or otherwise hold the absorbing liquid, the hold-up blanket or blanket member preferably should be made of a woven or a fibrous material. A list of suitable materials for the blanket member includes glass, cellulose, hemp, metals, rayon, orlon, nylon, and the like. Requirements for the back support member are that it possess reasonable rigidity that it will maintain a substantially constant shape when in use. It should also be wettable by the particular absorbing liquid employed in order that the liquid will tend to distribute itself over the entire support surface. The back support member may be made of wood, metal, plastic, et cetera, with balsa wood and stainless steel being preferred.

FIGURE 1 illustrates a flow diagram for the recovery of moisture from the air by means of a circulating hygroscopic liquid using the liquid distributor of the present invention. Water-poor hygroscopic liquid is passed to the top of open tower 1 which contains a plurality of liquid distributors 2. The hygroscopic liquid flows down the liquid distributors picking up water vapor from the air which is brought into contact with the tower by natural breezes or by a forced draft. The water-rich hygroscopic liquid at the bottom of the tower is collected and passed to a distillation unit 3 to separate the absorbed water and regenerate the hygroscopic liquid. While any type of distillation unit may be employed, the figure illustrates the use of a multi-stage solar still. Energy for separating the absorbed water from the hygroscopic liquid carrier is provided by solar radiation which passes through the light-transparent cover 4. The recovered water is removed at 5 while the progressively regenerated hygroscopic liquid passes in the opposite direction through the stages of the still and is collected in storage and feed tank 6. The regenerated or water-poor hygroscopic liquid is pumped to the top of tower 1 as required from feed tank 6, the amount of flow being controlled by adjusting valve 7 and by-pass return valve 8.

Figures 2, 3:
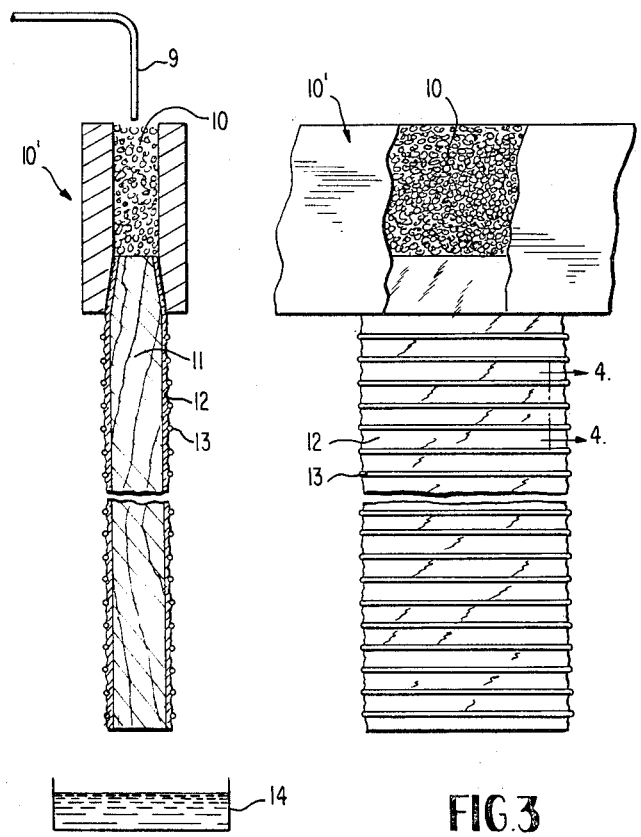
FIGURE 2 is an enlarged detail view in section of the feeding of the hydroscopic absorbent to a liquid-distributor comprising a back support member covered with a ridged blanket member.
FIGURE 3 is an enlarged fragmentary front view of the liquid-distributor shown in FIGURE 2.
Figure 4:
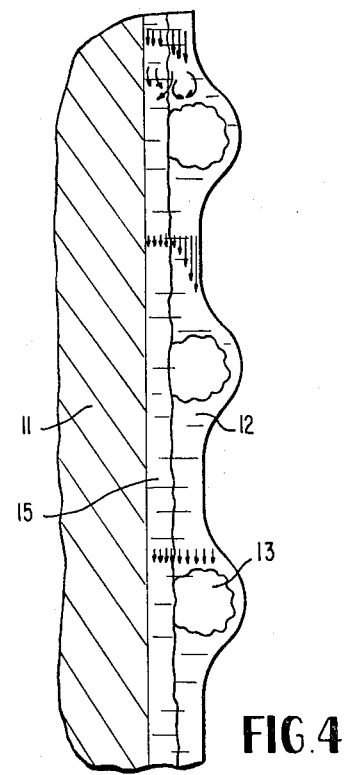
FIGURE 4 is an enlarged view in section taken along line 4—4 of FIGURE 3 and which shows the flow of the hydroscopic absorbent through the ridged blanket member.

In a preferred embodiment, illustrated in FIGURES 2, 3 and 4, the liquid distributor comprised an elongated balsa wood support and a hold-up blanket made of cotton corduroy cloth. The cloth was mounted by stretching it over the surface of the balsa and the cloth was held in place by stapling it into the wood. The liquid distributor was positioned so that the elongated dimension of the wood backing was vertical or perpendicular to the surface of the earth and the ridges in the corduroy cloth were horizontal or approximately parallel to the surface of the earth.

FIGURE 2 shows the addition of the hygroscopic liquid to the liquid distributor. For convenience, the hygroscopic liquid from pipe 9 was added to a porous material 10, maintained in a container 10', in contact with the top of the wooden support 11 and hold-up blanket 12. As the glycol made contact with the distributor, it spread out over the surface of the support member 11 and it also penetrated into the blanket member 12 which has a purality of ridges 13. As more liquid was fed to the distributor, the liquid continued to spread and to penetrate the blanket until a liquid sheet of uniform depth was created. This sheet of hygroscopic liquid moved down the distributor in a uniform mass velocity over all regions of the distributor. The depth of the liquid sheet was established by the thickness or depth of the blanket member, and this depth was observed to be essentially independent of the rate at which the hygroscopic liquid was fed to the top of the distributor. The flowing sheet of hygroscopic liquid was in contact with humid air and water transferred from the air to the flowing liquid. As the liquid took up water, its density and viscosity changed but the depth of the liquid layer remained constant. The resultant water-rich hygroscopic liquid falls into and is collected in basin 14 from which it may be sent to storage or to a still for recovery of the absorbed water and regeneration.

FIGURE 3 is a front view of the structure shown in FIGURE 2. A portion of the upper part of the figure is in section showing the porous packing 10. The figure particularly illustrates the multiple ridges 13 in the blanket member 12 and the parallel relation of the ridges to each other and to the ground.

FIGURE 4 is an enlarged section through line 4—4 of FIGURE 3. The arrows in 12 and 15 represent relative velocity vectors. The uniform depth liquid layer 15 passes downward at a uniform rate between the wooden support 11 and the hold-up blanket 12. The thickness of the hold-up blanket rises and falls in a regular periodic manner due to the presence of the multiple ridges 13 in the blanket. These ridges tend to dam the gravity-induced downward flow of the hygroscopic liquid through the hold-up blanket. At the same time, the surface layers of hygroscopic liquid in the blanket member absorb water from the air in contact with it resulting in a relatively higher velocity for the relatively water-rich, outermost portions of the hygroscopic liquid. The relatively slower moving innermost layers and the faster moving outermost layers are repeatedly remixed in an area of relatively stagnant flow around the ridges as compared with the relatively rapid flow in those areas of the blanket member between the ridges as more clearly illustrated by the arrows in the portion of the blanket in the upper portion of FIGURE 4. To this difference in flow rates and resultant mixing effects is attributed many of the beneficial results of operation according to the present invention.

In a related embodiment shown in FIGURE 5, the liquid distributor comprised a backing made of a thin walled stainless steel tubing 16. The ridged corduroy hold-up blanket 17 was wrapped in a spiral manner around the outside of the support member. The hygroscopic liquid was introduced from the inside of the tube via feed pipe 18 and porous packing 19. The liquid passed through holes 20 in the tube, which holes also extended through the blanket member in the illustrated form of the invention. The holes 20 need not, however, extend through the blanket member. As the hygroscopic liquid entered the blanket member, it first formed a broad channel on the blanket. Then, as the liquid moved downward, it followed a spiral path, tending to follow the spiral ribs of the ridged blanket member. The liquid moved down and around the tube tending to spread uniformly over the entire surface of the tube and continuing to follow a spiral path as it flowed downward.

A further variation of this embodiment is shown in FIGURE 6 where the spirally wound hold-up blanket does not completely cover the metal tube support member 16. As will be discussed below, such a periodic interruption in the blanket member promotes cross-flow within the liquid distributor.

In another modification of the liquid-distributor shown in FIGURE 7, multiple grooves 21 have been cut into the back support member 22 to facilitate the rate and the uniformity of spread of the liquid over the back support. These grooves should be narrow enough so that capillary action will be effective and should be deep enough so that the resistance to the flow of liquid through the groove will be small. The grooves may be cut so that they are substantially parallel to the surface of the earth as illustrated in the figure or they may be sloped to further facilitate cross-flow of liquid. The figure shows a relatively narrow blanket member 23 regularly spaced in the grooves. However, the blanket member need not be so disposed and other cross-flow promoting variations in the blanket member are possible.

The apparatus of the present invention may also be modified by varying the nature of the region between the support member and the blanket member. As stated previously, the support member and the blanket member should be in close proximity to each other and even actually in contact with each other. However, space must be provided for liquid flow between the two and the support member and the blanket member may not be completely glued to each other. On the other hand, if the distance between the support member and the blanket member is relatively large, and depending on the relative porosity of the latter, there will be a tendency for the liquid to move at a higher velocity in this middle region than within and over the other face of the blanket member and relatively inefficient absorption of water vapor from the air will result.

It has been found desirable in certain cases to provide an apparatus in which the spacing between the support member and the blanket member is variable. This may be accomplished by drilling a hole into the face of the support member and then forcing a plug or a pin from the exterior of the blanket member into the hole, as illustrated at 17' in FIGURE 5. This also serves to pin the blanket member onto the support member. A plurality of holes and plugs of any desired pattern or configuration may be employed. Instead of holes and plugs or pins, the same end may be accomplished with grooves and wedges. This type of apparatus produces wrinkles or folds in the blanket member in the region of the wedges or plugs, thereby providing a relatively wide space between the blanket member and the support member in certain regions of the distributor as well as very close contact between the two in other regions. Such variations in distance between the support member and the blanket member results in variations in flow rate of the hygroscopic liquid in the region between the two. This same type of variation in flow rate may be accomplished by wrapping a string, as a helix for example, around the exterior of the blanket member or by constructing ridges on the face of the support member and inside the hold-up blanket. To a similar end, staples may be located in appropriate positions over the surface of the distributor. The staples may be installed so that the line of squeeze on the blanket member is inclined from the horizontal to enhance a horizontal cross-flow.

The apparatus of the present invention may be further modified by using a multiple layer construction. As a non-limiting example of such a multiple layer construction, a first layer of corduroy cloth is covered with a layer of copper window screen followed by a second and outer layer of corduroy cloth. None of these layers need be continuous over all regions of the support surface. As an illustration, the screen may be cut as squares and installed at various places, for example, in a checkerboard fashion and then covered with the outer layer of corduroy. Or the cloth and the screen may be cut as strips of approximately equal width, with the second strip placed over the first strip so that both long axes are parallel and so that about half of the first strip is covered. The resultant multiple layer blanket member may then be wound in a spiral fashion around the back support member. It is apparent that many other multiple layer variations are possible.

The process and apparatus of the present invention are also applicable to the recovery of fresh water from saline waters. One of the major problems encountered in the recovery of potable water from the ocean or brackish water by evaporation is the fouling of the evaporator caused by the salts which are in the water forming scale or deposits of caked salts on the evaporator tubes. Such fouling is avoided when the water to be recovered is first transferred from the salt solution to a hygroscopic liquid. The water-rich hygroscopic liquid is then passed to the evaporator, still or other recovery device. Water is separated from the hygroscopic liquid in the recovery device and the regenerated water-poor hygroscopic liquid is returned for vapor contact and water transfer with another portion of the salt solutions.

According to the method of the present invention, the hygroscopic liquid is brought into near or vapor contact with the salt solution. A narrow space, usually filled with air or other suitable gas, separates the two liquid phases. Either one of the liquid phases, for example, the salt water, is contained on a liquid distributor having a moving blanket member and the other liquid phase is contained on a liquid distributor having a stationary blanket member.

As illustrated in FIGURE 8, the water-poor hygroscopic liquid from the regeneration or distillation unit 24, wherein the previously absorbed water has been recovered and removed, is passed to a vertical stationary liquid-distributor 25 which comprises a flat back support and a hold-up blanket on the inward pointing surface thereof. There is also provided a second stationary liquid-distributor 26 with a similar back support and a hold-up blanket also on the inward pointing surface thereof. The hygroscopic liquid from the bottom of the first distributor 25 is passed to the top of the second distributor 26. The water-rich hygroscopic liquid from the bottom of the distributor 26, which has been in vapor contact with the salt solution, is then returned to the regeneration or distillation unit 24 wherein the absorbed water is recovered and removed via pipe 34.

The two elongated vertical stationary liquid-distributors 25 and 26 outline a roughly rectangular area. Within this area is the liquid distributor having a moving hold-up blanket. The moving hold-up blanket 28 is essentially an endless belt which moves in a counterclockwise direction over the two stationary essentially vertical support members 29 and 30. Thus the direction of movement of the blanket is essentially in a vertical direction up the right hand support member 29 and down the left hand support member 30. The belt 28 may consist of one wide belt or it may be sectionalized, i.e., constructed of a plurality of narrower belts moving parallel to each other; each section can be made to move at a velocity different from its adjacent section. The belt may also consist of a moving support member, the blanket member may move with the support member or the two may move at different velocities. The support member may, for example, be constructed of sectionalized rigid plates or it may be constructed of a flexible sheet such as a continuous band of thin stainless steel metal. The continuous belt is driven by rotating drum 31 or any other suitable means. Provision is made to remove any solid salt deposits that may build up on the belt by means of scraper 32 and brush 33 or by washing with a suitable solvent or solution.

A salt solution from which water is to be recovered is introduced through a port 27 cut in the support member 29 onto the ascending side of the moving hold-up blanket 28. The salt solution flows downward as the belt moves upward; the rate of ascent of this side of the belt is adjusted so that the falling salt liquor does not reach below the lower idler roller. The salt solution is carried by the belt over the top roller and then flows downward over the descending surface of the belt.

The evaporative surfaces of the two stationary liquid distributors 25 and 26 are approximately parallel to the absorptive surfaces of the moving belt 28. The absorbent hygroscopic liquid flows in a downward direction over both of the stationary distributors 25 and 26. Thus the transfer of water between the salt solution on the descending belt surface and the hygroscopic liquid may be considered a co-current type of operation while the transfer between the ascending salt liquor surface and the descending hygroscopic liquid surface may be considered as counter-current. When the water-poor hygroscopic liquid is brought in vapor contact first with the water-lean salt liquor and then with the water-rich salt liquor, the overall effect is counter-current. This can be reversed by introducing the water-poor hygroscopic liquid first to the ascending salt liquor side and then to the descending side.

Any series of contacting units, such as the ones illustrated, may be employed to give an overall co-current or overall counter-current effect or any desired combination of co-current and counter-current operations.

Having described my invention, I claim:

1. Apparatus for extracting a liquid from a gas containing the vapor phase of the liquid which comprises a back support member extended in a direction at an angle to the horizontal and a wettable blanket member in close proximity therewith, said blanket member being provided with projecting ridges extending in a direction having a major horizontal component, means for directing a liquid to the upper end of the back support member and into contact with the blanket member, and means for directing a stream of gas into contact with the extended surfaces of the blanket member.

2. A liquid-distributor for extracting water from the air which comprises a substantially vertical support member extended in the vertical direction and a wettable blanket member in close proximity therewith, said blanket member being provided with projecting ridges extending in a direction having a major horizontal component, means for directing a liquid to the upper end of the back support member and into contact with the blanket member, and means for directing a stream of gas into contact with the extended surfaces of the blanket member.

3. A liquid-distributor according to claim 2 wherein the projecting ridges are parallel to the ground.

4. A liquid-distributor according to claim 2 wherein the projecting ridges are wound about the support member in a spiral manner.

5. A liquid-distributor according to claim 2 wherein the blanket member is only in partial contact with the support member.

6. A liquid-distributor according to claim 2 wherein the spacing between the support member and the blanket member is variable.

References Cited

UNITED STATES PATENTS

| | | | |
|---|---|---|---|
| 1,967,586 | 7/1934 | Minton | 55—492 |
| 2,660,166 | 11/1953 | Coleman | 55—492 |
| 2,816,663 | 12/1957 | Kovacs et al. | 210—347 |
| 3,119,887 | 1/1964 | Baehr | 55—233 |
| 3,161,574 | 12/1964 | Elam | 202 |
| 3,177,139 | 4/1965 | Kimberlin et al. | 210—21 |
| 3,208,204 | 9/1965 | Persson | 55—186 |
| 3,225,524 | 12/1965 | Berrian | 55—431 |
| 3,227,649 | 1/1966 | Ghormley et al. | 210—21 |
| 3,233,390 | 2/1966 | Meyers | 55—32 |

FOREIGN PATENTS

| | | |
|---|---|---|
| 3,948 | 6/1913 | Great Britain. |
| 392,475 | 5/1933 | Great Britain. |

OTHER REFERENCES

Heating and Ventilating, "Dehumidifying and Air Sterlization with Triethylene Glycol," January 1946, pp. 78–80.

REUBEN FRIEDMAN, *Primary Examiner.*

C. N. HART, *Assistant Examiner.*